United States Patent [19]
Lai

[11] Patent Number: 5,078,578
[45] Date of Patent: Jan. 7, 1992

[54] PNEUMATIC DEVICE FOR DETECTING HYDROMETRIC LEVEL

[76] Inventor: Salvatore Lai, Via Dr. Vincenzo Puddu, Ovodda (Prov. of Nuoro) 08020, Italy

[21] Appl. No.: 529,352

[22] Filed: May 25, 1990

[30] Foreign Application Priority Data

May 25, 1989 [IT] Italy .................... 47998 A/89

[51] Int. Cl.5 .............................. F04B 49/02
[52] U.S. Cl. ................... 417/38; 200/81.4; 200/83 C
[58] Field of Search ............ 417/38; 73/299, 302, 73/729; 200/81.4, 83 C, 83 A

[56] References Cited

U.S. PATENT DOCUMENTS

| | | | |
|---|---|---|---|
| 1,315,258 | 9/1919 | Suren | 200/83 C |
| 2,345,464 | 3/1944 | DeGiers | 73/302 |
| 3,319,571 | 5/1967 | Schaefer | 417/38 |
| 3,397,716 | 8/1968 | Andersson | 417/38 |
| 3,542,011 | 11/1970 | Langenbeck | 73/729 |
| 3,975,115 | 8/1976 | Fisher et al. | 417/38 |
| 4,087,204 | 5/1978 | Niedermeyer | 417/38 |
| 4,311,892 | 1/1982 | Engelander | 200/81.4 |

Primary Examiner—Richard A. Bertsch
Assistant Examiner—David W. Scheuermann
Attorney, Agent, or Firm—Thomas R. Vigil; James P. Hanrath

[57] ABSTRACT

A pneumatic device for detecting continuously the hydrometric level of a water column, said device comprising a tubular probe dipped into the liquid column by a height greater than the distance between the two maximum and minimum levels set forth previously, a pair of pneumatic detectors of the minimum and the maximum level which are operatively associated to said probe and are put in action by changes in the air pressure occurring inside the probe itself as a function of changes in the column level, a gauge or indicator associated to the maximum level detector for signaling continuously the position of the water level, and means for starting or for stopping a motor-driven pump in correspondance to said maximum and minimum values.

8 Claims, 8 Drawing Sheets

PNEUMATIC DEVICE FOR DETECTING HYDROMETRIC LEVEL

BACKGROUND OF THE INVENTION

This invention relates to a pneumatic device for detecting continuously the hydrometric level of a water column (a well, a tank, a gathering basin and so on), and for operating automatically a manufacturing machine (as for instance, a motor-driven pump) in correspondence with two values of minimum and maximum level that are set forth previously.

In plants for rising and conveying a liquid, and in particular water, which are fed by a well, a reservoir, a tank, a basin or a tub or by any other system for holding water, it is very important to know the level of the available liquid at any time in order to operate in a suitable and safe way the manufacturing machine, which generally consists in a motor-driven pump that is to carry out the rising of water and/or the conveying of the same.

When plants of heights of a few meters and wells of diameters larger than about 50 cm are dealt with, such problem has no particular bearing and the intervention of the motor-driven pump is caused to occur on direct command, by a float switch that is free to operate because of the wide space available.

In the case of plants of diameters from 15 cm to about 50 cm and of heights of some ten meters, said systems are unsuitable or poorly reliable because of the reduced space, and anyway they do not allow the value of the level or of the water volume available to be known directly as shown on a control panel board placed at a distance from the well, nor do they allow the most suitable drawing of water to be programmed each time automatically and said drawing to be stopped when the water level reaches a point below a minimum value which has been set forth previously directly from the control board of the motor-driven pump.

The object of the present invention consists in the solution to the problem outlined above, by means of a device that allows the hydrometric level of a water column to be detected continuously, and that allows a motor-driven pump to be put automatically in operation in correspondence with two values set forth previously: i.e., a maximum and a minimum value, at which the motor-driven pump is started or stopped.

In the case of a well, the starting of the motor-driven pump is operated automatically when a maximum level previously set forth is attained, and the stop of the motor-driven pump is operated automatically at the very moment when the water column goes below the minimum level which is set forth previously on the control board. As it is possible to detect at any time the value of said level, it is evident that the device in question allows the amount of the water drawn by the plant to be adjusted according to the operative procedures which are thought of as the most suitable.

According to the present invention, a device is provided which comprises, in combination, a tubular probe dipped into the liquid column, a pair of pneumatic detectors of the minimum and maximum level, which are operated by the air pressure occurring within said probe, and a command and signaling unit or assembly that causes the operation and the stop of a motor-driven pump, respectively, when the maximum and the minimum hydrometric level of the water column are reached.

Again according to the present invention, the pneumatic detector of maximum level is associated to a system capable of transducing the air pressure within the detector itself into a signal which is indicative of the hydrometric level, said level being variable between said two maximum and minimum values.

This invention will be disclosed in the following with reference to the enclosed drawings, which represent just for illustrative and not for limitative purposes a preferred kind of embodiment of the invention itself.

Figure 1:
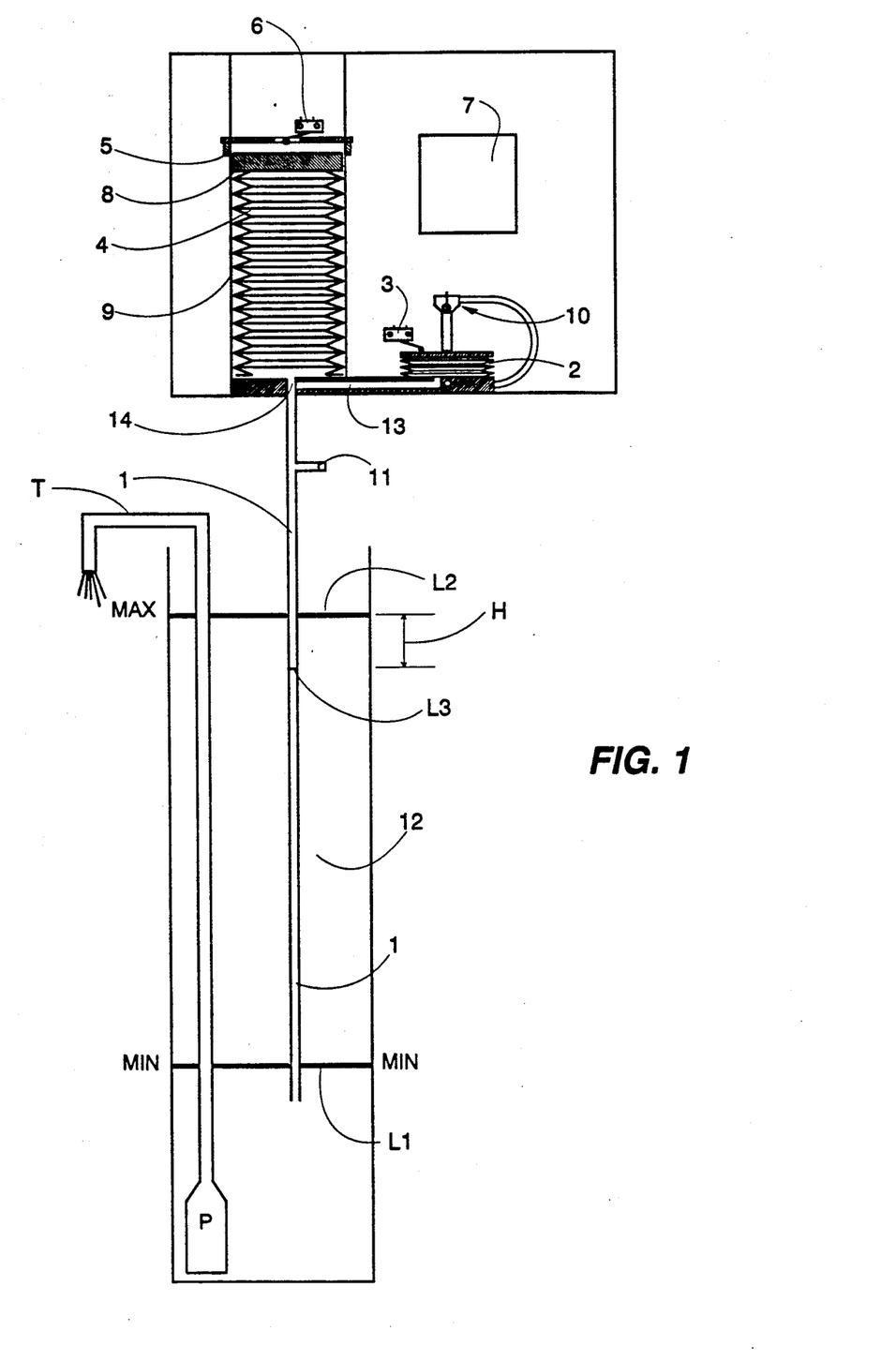
FIG. 1 shows the functional diagram of the device.

With reference now to FIG. 1, the numeral 1 points out a tubular probe dipped into a water column 12 whose level is variable from a minimum value L1 to a maximum value L2. A motor-driven pump P is arranged below the minimum level, which pump conveys water to the rising and conveying pipe T.

Water inside said tubular probe 1 reaches a level L3 which is lower than the maximum level L2, and such level difference makes up the water head H.

The tubular probe 1 is directly connected to the maximum level detector 4 and, through a diverted conduit 13, to the minimum level detector 2, said probe bearing in its upper portion a valve 11 for the introduction of air, in order to adjust the air volume in the system that causes the pump to stop at the most suitable height as the minimal level. With changes in the level of the water column 12, a corresponding variation of the level L3 within the probe 1 occurs, so that the air contained within the probe itself undergoes a pressure change proportional to said variation. When the level in the water column 12 rises, the air contained within the probe 1 is compressed, but it can only cause the pneumatic detector 2 to rise up to the point where it closes the switch 3 because of the resisting force exerted by the weight of the small plate 8 which loads the pneumatic detector 4.

When the level of the liquid column rises further, the air which is compressed through the direct conduit 14 causes also the second maximum-level detector 4 to rise up to the point at which the small top-plate 8, which can slide inside the guiding cylinder 9, acts on the maximum level switch 6 that controls the pump 8 through the running relay 7.

Figure 6:
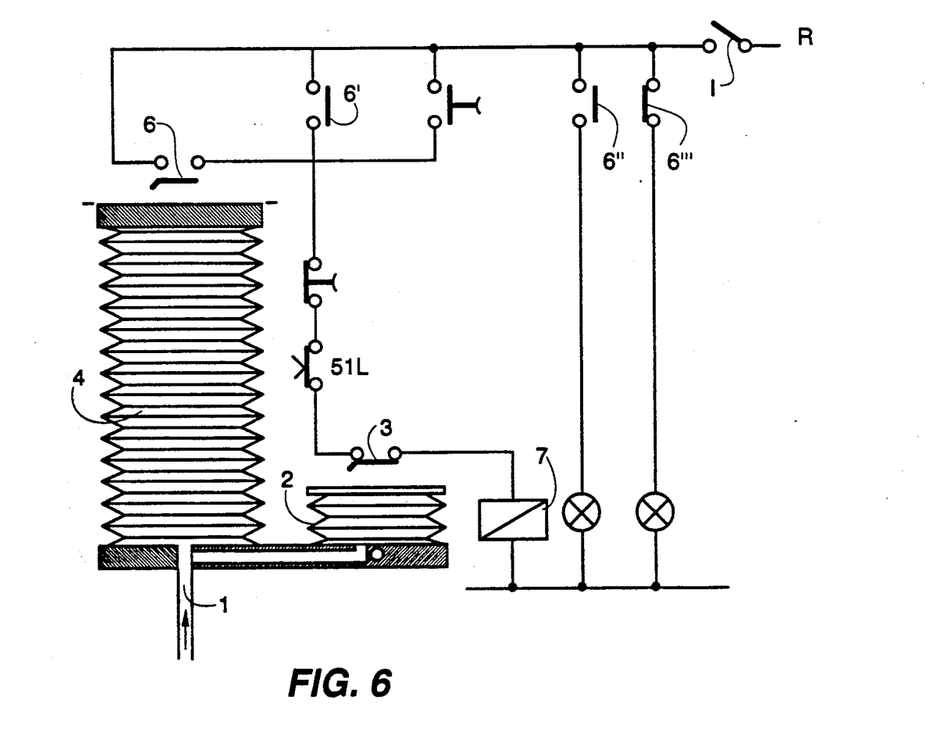
FIG. 6 shows the general wiring diagram, all signaling, command, and safety systems being pointed out.

It is to be observed that the supporting plate of the maximum level switch 6 just rests on the thin band 5 and it is free to run above the band itself inside the cylinder 9 when the control unit 1 of FIG. 6 is cut off, as when the control units are cut off the detector 4 can take the small plate up to the end of the stroke while leaving said band stationary. The position of the thin band 5 can be adjusted along the guide 9, so that it is possible to set forth the value of the maximum level L2 previously at the height which is thought of as the most suitable.

When the level within the liquid column 12 decreases down to the minimum value L1, the two pneumatic bellow-detectors 2 and 4 are lowered obviously in different ways, and when the minimum level detector 2 causes the switch 3 to open because of lack of air, the pump P receives the stop command through the relay 7.

FIGS. 2-5, in which equal reference numerals point out parts that have been already disclosed, illustrate the details of the device according to the present invention, said device operating according to the principle disclosed above.

Figure 2:
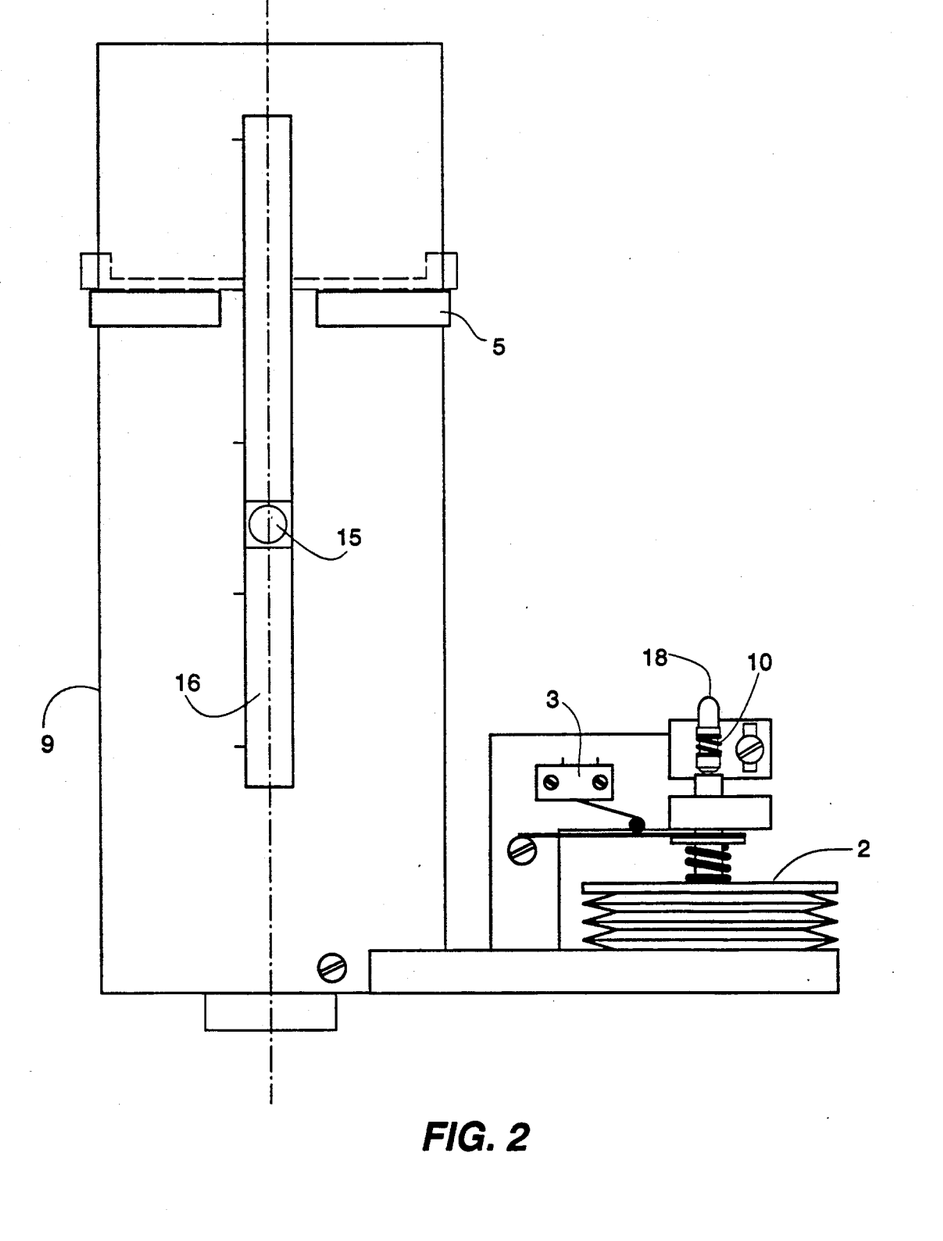
FIG. 2 shows the front view of the device according to the present invention.
Figure 2A:
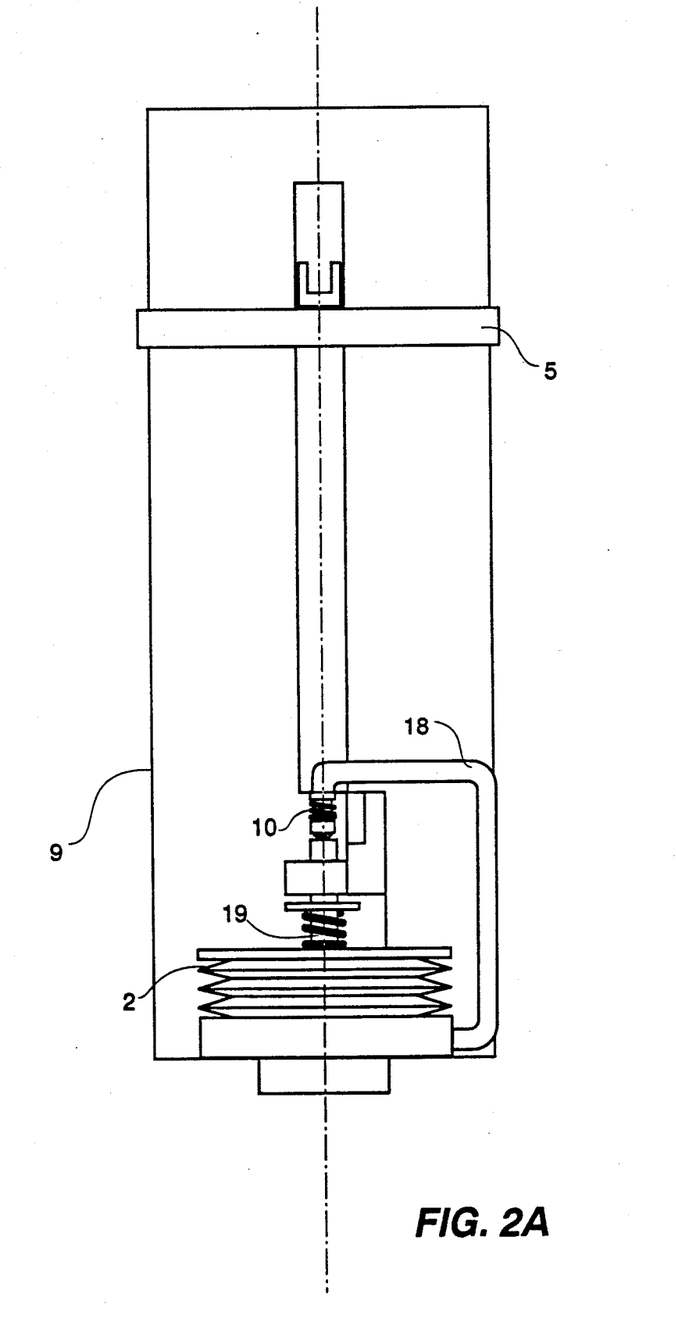
FIG. 2A shows the right side view of the device looking at FIG. 2.
Figure 3:
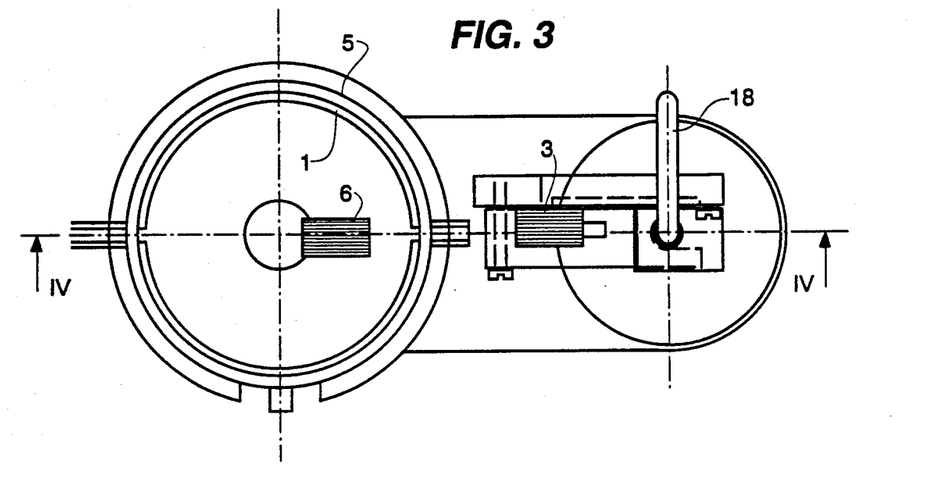
FIG. 3 shows the top plan view.

As shown in FIG. 2, a slider 15 integral with said small plate 8 points out sliding within the guiding cylinder 9 and along the graduated scale 16 the height of the water level inside the column 12, starting from the "zero" value corresponding to the minimum level, up to the value of "4/4" corresponding to the maximum level. The motion of said slider 15, by means of electromechanical systems which are not disclosed as they are already known, can also be converted into a signal that points out said instantaneous value of the level on a suitable dial.

Figure 4:
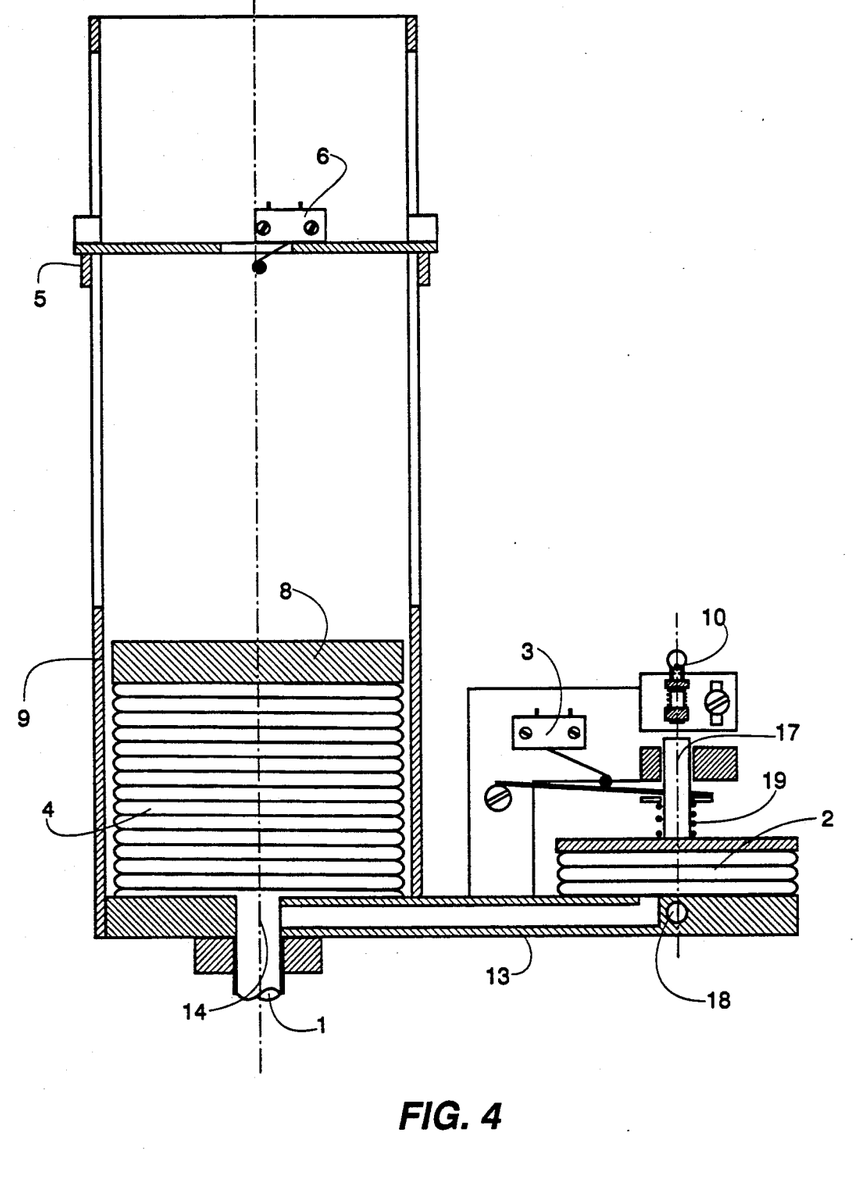
FIG. 4 shows the cross-sectional view of the device along the plane IV—IV of FIG. 3, when the level is below the minimum value.

When the level is below the minimum value and the filling of the column 12 is started, the device is in the conditions shown in FIG. 4, the two bellow-detectors 2 and 4 being completely lowered. As soon as the minimum level detector 2 rises, the switch 3 connected to the running relay 7 is closed by the same and said detector does not reach the end of the stroke. As the level within the water column 12 goes on rising, the small plate 8 of the detector 4 also rises up to the level set forth previously by said thin band 5, and said plate acts on the maximum level switch 6 that gives the starting command to the pump P through the relay 7 already preset by the switch 3 that had been closed previously.

Figure 5:
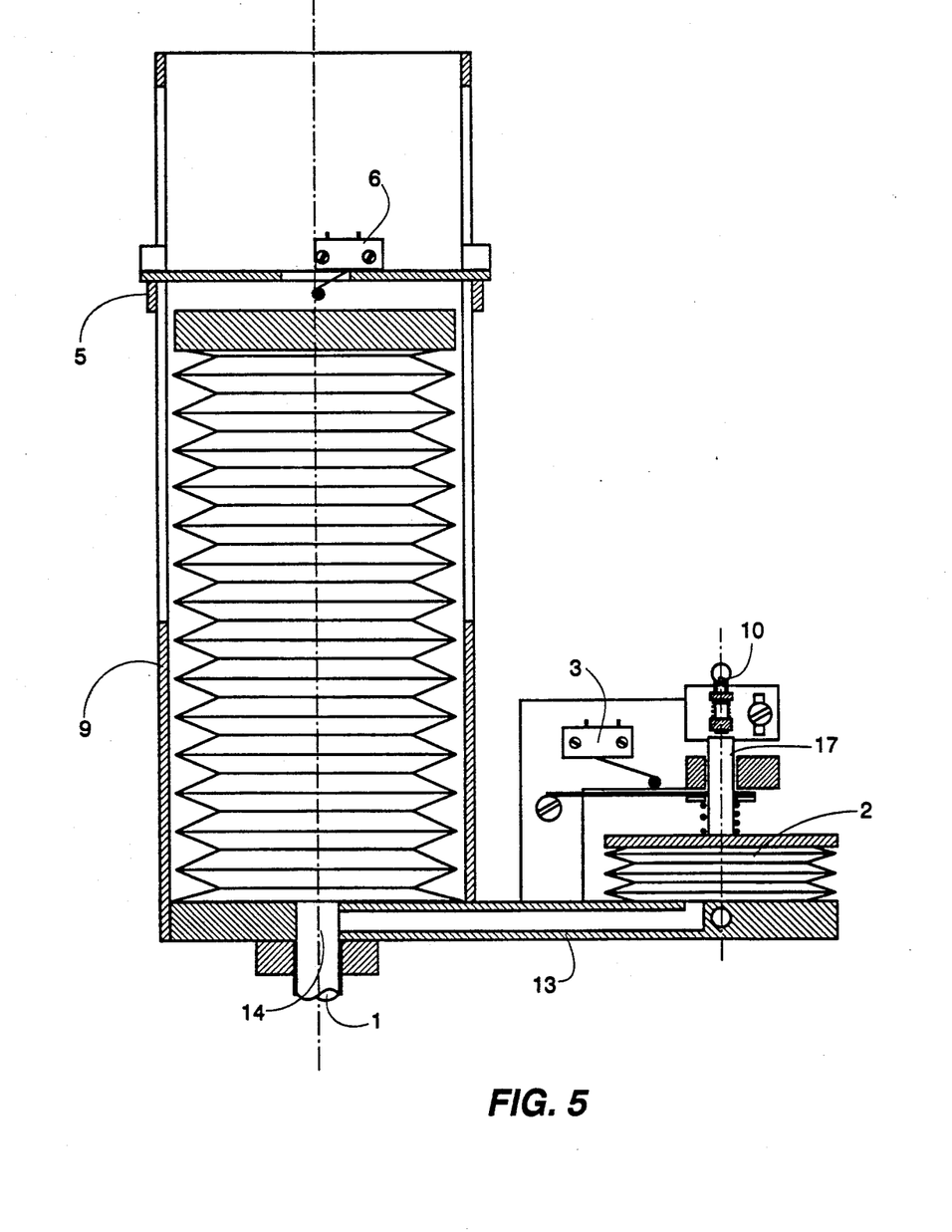
FIG. 5 is a view similar to that of FIG. 4, and it shows the device when the level is at an intermediate value between the minimum and the maximum level.

When the level within the column 12 lowers, the detector 4 also is lowered down to the minimum value together with the level of the liquid, so opening again the switch 6, and so that the detector 2 lowers due to lack of pressurized air and opens again the switch 3, so sending the stop command to the motor-driven pump P.

In calibrating the device at the maximum pressure, the detector 2 reaches the end of the stroke compressing its spring 19, and it takes the push rod 17 up to the point where it acts on the safety valve 10 which causes the excess air to be vented through the conduit 18 so as to avoid over-pressure inside both detectors.

Obviously, if the filling of the column 12 occurs instead of the delivery of water from the pipe T, the operation of the device is fully similar, the starting command to the pump P occurring at the minimum level, while the stop command occurs when the maximum level is attained.

FIG. 6 shows the general wiring diagram comprising the various command, signaling and safety components.

Said assembly, in addition to its component members already disclosed above, also comprises the self-check auxiliary contact 6' of the running relay 7, the auxiliary contact 6" connected to the pilot lamp LM for signaling the running state, and the auxiliary contact 6'" connected to the pilot light LF that signals the stop. The running relay 7 and the minimum level switch 3 are connected to the thermal switch 5 IL of the motor. Moreover, the switch I for inserting automatic control is provided, as well as the running push button RB and the STOP push button.

Figure 7:
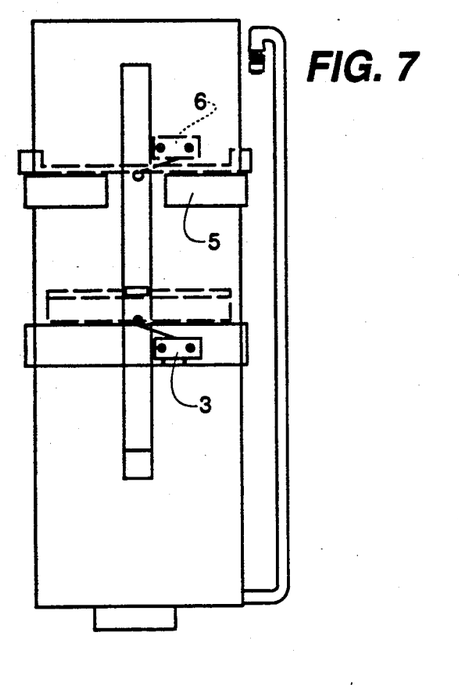
FIGS. 7, 8 and 9 show, respectively, the outer side view, the longitudinal cross-section and the operation diagram of a variant embodiment of the device of the present invention, said embodiment having a single bellow-detector instead of two such detectors.
Figure 8:
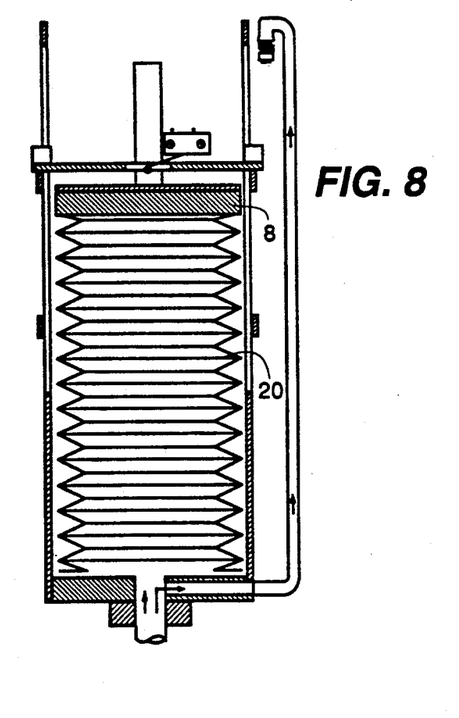
Figure 9:
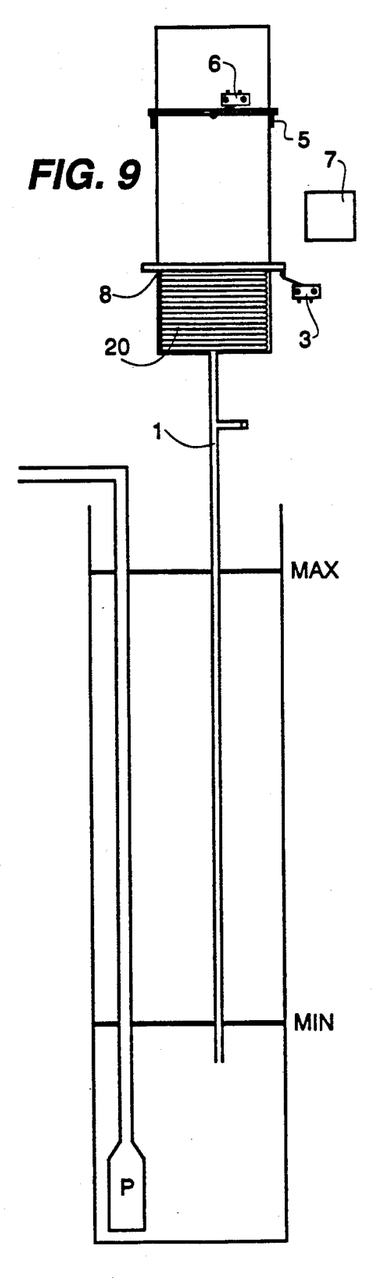

With reference now to FIGS. 7, 8 and 9 according a variant embodiment, the pair of bellow-detectors is substituted with a single detector which is pointed out by the reference numeral 20. The operation of said single detector is obvious on the basis of the previous disclosure: when the water level rises, water through the tubular probe 1 pushes air into the detector 20 which rises and causes the small plate 8 to move up to a position where it closes the auxiliary switch 3 of the running relay 7. When the well or reservoir controlled by said device becomes further filled, the detector 20 goes on rising till it reaches the thin band 5 for adjustment of the value of the maximum level, which band bears the corresponding switch 6. Said switch starts the motor-driven pump P through the running relay 7, said pump causing the well or reservoir to be emptied.

When the level in the well or reservoir lowers, the detector and the small plate above the same also lower down to the point where the minimum level switch 3 is opened, said switch resetting another filling cycle by deenergizing the running relay 7.

The whole disclosure given above has been referred to the filling or emptying of a water column, but it is evident that the device also lends itself to the employment for liquids other than water.

The device according to the invention can also be used to check directly the level of the liquid contained in small reservoirs of domestic use located both within and without the houses or other premises.

Figure 10:
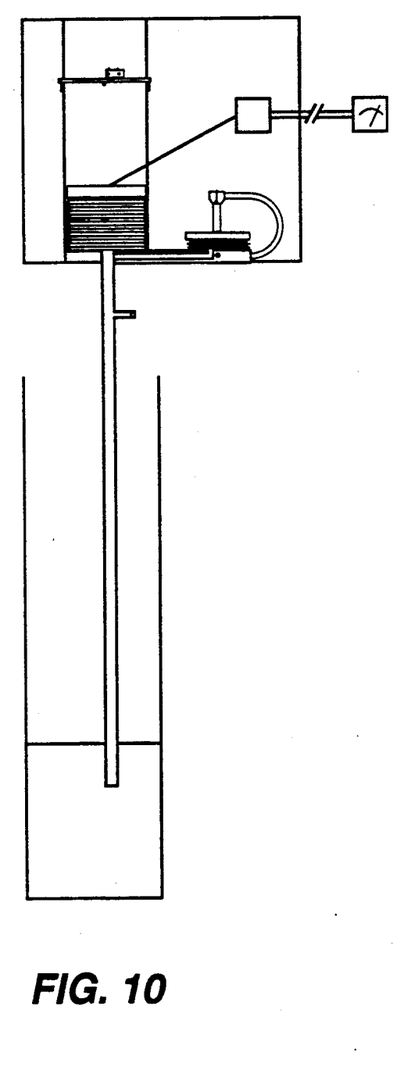
FIGS. 10 and 11 show schematically another employment of the device of the present invention for detecting the level of the liquid in small reservoirs, respectively, at the minimum and at the maximum level positions.
Figure 11:
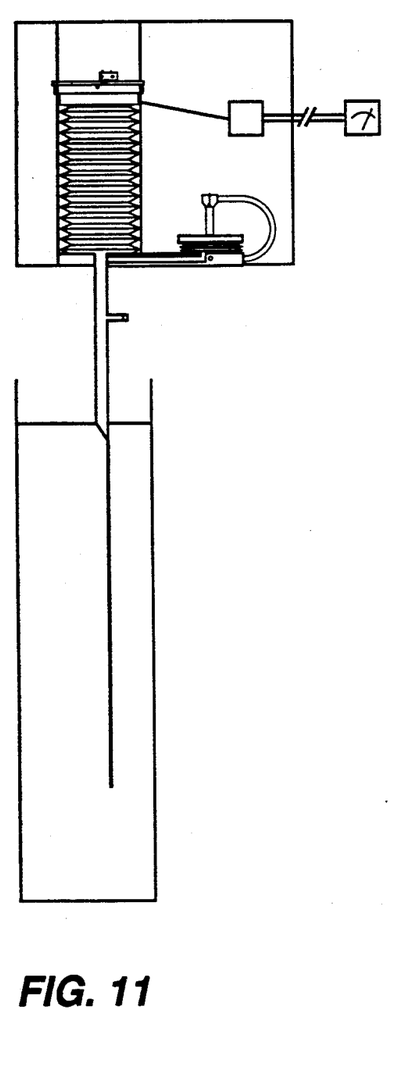

This is possible, as seen in FIGS. 10 and 11, by the use of an elastic probe like a rubber hose closed at the lower end and allowing air to be conveyed to the level indicator as the level of the liquid rises in the reservoir. The level indicator can in turn, by actuating a potentiometer, provide an electrical signal which will be received by a measuring instrument acting as an indicator and located within the houses or premises concerned.

The same assembly, instead of the rubber hose probe, can be actuated through a bellow indicator connected to the described assembly by means of an upper small connecting tube and positioned so as to be squeezed as the free water surface rises.

The present invention has been illustrated and disclosed according to some preferred embodiments of the same, but it is to be understood that modifications and changes in the structures of the same can be introduced as a matter of practice without departing from the spirit and scope of the invention for which a priority right is claimed.

I claim:

1. A pneumatic device for detecting continuously the hydrometric level of a liquid column, and for automatically controlling the operation of a motor-driven pump, at the maximum and the minimum level positions, said device comprising a tubular probe dipped into the liquid column by a height greater than said level difference, and at least one pneumatic detector which is operatively associated with said motor-driven pump and is sensitive to changes in the air pressure within said probe as an effect of the corresponding changes in the hydrometric level of the liquid column, characterized in that it comprises a single detector which is made up of a bellow operatively associated during its extension motion to a minimal level switch and to a maximum level switch, said switches being spaced from one another along the vertical line of the guiding cylinder of the bellow itself.

2. A pneumatic device for detecting continuously the hydrometric level of a liquid column, and for automatically controlling the operation of a motor-driven pump, at the maximum and the minimum level positions, said device comprising a tubular probe dipped into the liquid column by a height greater than said level difference, and at least one pneumatic detector which is operatively associated with said motor-driven pump and is sensitive to changes in the air pressure within said probe as an effect of the corresponding changes in the hydrometric level of the liquid column, characterized in that it comprises two pneumatic detectors which are made up of a pair of bellows connected to each other and with the tubular probe, one of which is associated to a second switch that becomes closed when the maximum level is reached, said bellows expanding in differentiated manner because of a suitable weight loading on the maximum level bellow in such a way that when the water column is at the minimum level only the bellow on which no weight is loaded is activated, while the weighted bellow is activated only when the maximum level is reached.

3. A device according to claim 2, characterized in that the minimum level detector is fed by a conduit which branches off said probe, said detector being associated to a valve for discharging the overpressure that intervenes after said detector has reached the upper end of the stroke.

4. A device according to claim 2, characterized in that said weight is a small plate which is capable of sliding inside a guiding cylinder, said small plate as well as the maximum level switch being supported freely by a thin hand whose height along said guiding cylinder is adjustable in order to adjust the maximum level at a position previously set forth.

5. A device according to claim 2, characterized in that said small plate which can slide is connected to a slider that points out on a graduated scale or on a dial instrument the position of said small plate and hence the value of the level within the liquid column.

6. A device according to claim 2, characterized in that said minimum and maximum level switches are operatively associated to a running relay which sends a starting or a stop command to the motor-driven pump.

7. A device according to claim 2, characterized in that said minimum and maximum level switches, as well as the running relay connected to them are inserted in an assembly comprising a set of control, signaling and safety components.

8. A pneumatic device according to claim 1, characterized in that for checking the level of the liquid contained in small reservoirs, the tubular probe is an elastic probe like a rubber hose closed at the lower end and allowing air to be conveyed to the level indicator as the level of the liquid rises in the reservoir.

* * * * *

UNITED STATES PATENT AND TRADEMARK OFFICE
CERTIFICATE OF CORRECTION

PATENT NO. : 5,078,578

DATED : January 7, 1992

INVENTOR(S) : Salvatore Lai

It is certified that error appears in the above-identified patent and that said Letters Patent is hereby corrected as shown below:

Col 5, Line 24 "associated to" should be --associated to a minimum level switch while the other one is associated to--.

Col 6, Line 28, "claim 1" should be --claim 2--.

Signed and Sealed this

Thirty-first Day of August, 1993

Attest:

BRUCE LEHMAN

*Attesting Officer*  *Commissioner of Patents and Trademarks*